(12) United States Patent
Servantie et al.

(10) Patent No.: US 11,320,106 B2
(45) Date of Patent: May 3, 2022

(54) THIN ASPECT LASER HOT-SPOT MODULE AND OPTICAL BEAM SYSTEM OF AUTOMOTIVE ILLUMINATION SYSTEM

(71) Applicant: Valeo North America, Inc., Troy, MI (US)

(72) Inventors: Ambroise Servantie, Seymour, IN (US); John Orisich, Seymour, IN (US); Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/012,347

(22) Filed: Sep. 4, 2020

(65) Prior Publication Data
US 2022/0074562 A1    Mar. 10, 2022

(51) Int. Cl.
| F21S 41/16 | (2018.01) |
| F21S 41/141 | (2018.01) |
| B60Q 1/04 | (2006.01) |
| F21S 41/40 | (2018.01) |
| F21S 41/60 | (2018.01) |
| F21S 41/25 | (2018.01) |
| F21S 41/32 | (2018.01) |
| F21S 45/47 | (2018.01) |
| F21S 41/43 | (2018.01) |
| F21Y 115/30 | (2016.01) |

(52) U.S. Cl.
CPC ............... *F21S 41/16* (2018.01); *B60Q 1/04* (2013.01); *F21S 41/141* (2018.01); *F21S 41/25* (2018.01); *F21S 41/321* (2018.01); *F21S 41/40* (2018.01); *F21S 41/43* (2018.01); *F21S 41/60* (2018.01); *F21S 45/47* (2018.01); *F21Y 2115/30* (2016.08)

(58) Field of Classification Search
CPC ................................ F21S 41/321; F21S 41/43
See application file for complete search history.

(56) References Cited

U.S. PATENT DOCUMENTS

| 6,948,836 B2 * | 9/2005 | Ishida | F21S 41/365 362/516 |
| 7,156,544 B2 * | 1/2007 | Ishida | B60Q 1/14 362/538 |
| 9,977,169 B2 | 5/2018 | Kurt et al. | |

(Continued)

FOREIGN PATENT DOCUMENTS

CN    204201727 U    3/2015

*Primary Examiner* — William N Harris
(74) *Attorney, Agent, or Firm* — Valeo North America, Inc.

(57) ABSTRACT

The present invention relates to an optical arrangement system for an automotive headlamp that includes a first low-beam module adapted to generate a first luminous intensity distribution with a kink or elbow feature where the low-beam module includes: a high luminous source to emit light along an optical axis; a reflector for reflecting the light emitted from the at least one high luminous source forward; a projection lens having a height of about 10 mm that is arranged in operative relationship with the reflector; a folder arranged in an optical path between the reflector and the projection lens where the folder includes a bump feature to facilitate the first luminous intensity distribution generation with application of the kink or elbow feature; and where the reflector has a reflection surface which features an elliptical surface whose center axis is not aligned with the optical axis.

18 Claims, 10 Drawing Sheets

(56) References Cited

U.S. PATENT DOCUMENTS

| | | | |
|---|---|---|---|
| 2009/0122567 A1* | 5/2009 | Mochizuki | F21S 41/43 |
| | | | 362/509 |
| 2011/0280039 A1 | 11/2011 | Kishimoto | |
| 2018/0163939 A1* | 6/2018 | Chen | F21S 41/663 |
| 2019/0001864 A1* | 1/2019 | Makino | F21S 41/19 |

* cited by examiner

THIN ASPECT LASER HOT-SPOT MODULE AND OPTICAL BEAM SYSTEM OF AUTOMOTIVE ILLUMINATION SYSTEM

FIELD OF INVENTION

The present invention relates to the motor vehicle lighting field. More specifically, the invention relates to headlamp optical systems applied to vehicles.

BACKGROUND

Motor vehicles contain numerous lighting devices for both interior and exterior illumination. For example, exterior vehicle lighting devices may perform stop lamp functions, tail lamp functions, headlamp functions, and daytime running light functions, dynamic bending light functions and fog lamp functions.

Most countries, states or regions that use motor vehicles have various requirements and standards that a vehicle must comply with in operation on roadways. For example, Federal Motor Vehicle Safety Standard (FMVSS) No. 108 specifies various maximum and minimum photometric intensity values (based on angle) for vehicle headlamps operated within the United States.

The United States based Insurance Institute for Highway Safety (IIHS) has its own set of tests and ratings (Headlight Test and Rating Protocol) for headlamp performance. The IIHS tests and ratings seek to encourage manufacturers to improve the illumination performance in actual on-road use.

IIHS evaluations have shown that on-road illumination provided by vehicle headlamps varies widely. In addition, IIHS rates the majority of headlamps in a poor category (e.g. insufficient illumination, excessive glare, etc.). The IIHS testing protocol tests headlamp in five category curve conditions: $1/150$ meter radius Left curve, $2/250$ meter radius Left curve, 3/Straight roadway, $4/250$ meter Right curve and $5/150$ meter Right curve.

In recent years, vehicle lighting has also become important for its aesthetic appeal to consumers. It may be technically challenging to provide aesthetically appealing vehicle lighting devices while also meeting cost, technology and regulatory requirements. For example, lens height reduction for lighting modules requires using LEDs with higher luminance ($cd/mm^2$) than other conventional products to meet regulation requirements at the test points.

The "background" description provided herein is for purposes of presenting the general context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY OF INVENTION

The present invention is directed to a unique solution to one or more of the problems discussed above. It is believed that that the present invention furthers the field by adopting a compact or miniaturized design bound within a thin-aspect low-beam kink module that implements a hot spot feature while still meeting regulation requirements. It is another objective to provide a lighting module system with a lens height reduction design that enhances existing LED light sources with higher luminance ($cd/mm^2$) than other conventional products to meet existing regulation requirements. Furthermore, the present invention relates to providing a low-beam kink module that reduces packaging profiles, enhances power or lighting efficiencies and achieves target outputs by using a single laser light source.

Accordingly, pursuant to a first aspect of the present invention, there is contemplated an optical arrangement system for a headlamp, wherein the optical arrangement system comprises: a first low-beam module adapted to generate a first luminous intensity distribution with a kink or elbow, wherein the low-beam module includes: a high luminous source to emit light along an optical axis; a reflector for reflecting the light emitted from the high luminous source forward; a projection lens having a height of about 10 mm that is arranged in operative relationship with the reflector; and a folder arranged in an optical path between the reflector and the projection lens, where the folder includes a bump to generate the first luminous intensity distribution with the kink or elbow; and wherein the reflector has a reflection surface represented by an elliptical surface whose center axis is not aligned with the optical axis.

The invention may be further characterized by one or any combination of the features described herein, such as the first low beam module has an aspect ratio of width-to-height ratios of about 10:25; where the reflector may include a first focal point and a second focal point; where a focal length of the first focal point may be about 4 mm and the focal length of the second focal point may be about 30 mm; where the high luminous source may be arranged at the first focal point of the ellipse formed by the reflector; where the optical axis may be offset from the center axis of the elliptical surface; where the second focal point may represent a distance of about 18 mm to 20 mm from the lens; where the first luminous intensity distribution may include a maximum intensity of a hot spot region; where the high luminous source may include a laser light source; where the bump may have a spherical shape; where the bump may have a triangular shape; where a second low beam module may include at least one light source optically configured to emit a second luminous distribution that may have a larger beam spread distribution as compared to the first luminous intensity distribution; and may have a high beam module configured to generate a high beam distribution.

Accordingly, pursuant to a second aspect of the present invention, there is contemplated an optical arrangement system for a headlamp, comprising a first low beam module adapted to generate a first luminous intensity distribution with a kink or elbow, wherein the first low beam module includes: a high luminous source to emit light along an optical axis; a reflector for reflecting the light emitted from the high luminous source forward; a projection lens having a height of about 10 mm that is arranged in operative relationship with the reflector; a folder arranged in an optical path between the reflector and the projection lens, and where the folder includes a bump to generate the first luminous intensity distribution with the kink or elbow; wherein the reflector has a reflection surface which is an elliptical surface whose center axis is not aligned with the optical axis; and; wherein the reflector includes a first focal point and a second focal point, and wherein a focal length of the first focal point is about 4 mm and the focal length of the second focal point is about 30 mm.

Accordingly, pursuant to a third aspect of the present invention, there is contemplated a headlamp assembly comprising: a plurality of low beam modules having a first low beam module optically configured to emit a first luminous distribution with a kink, and a second low beam module optically configured to emit a second luminous distribution without a kink feature that has a larger beam spread distribution as compared to the first luminous distribution, wherein the first low beam module includes a reflector for reflecting the light emitted from a high luminous source forward, and the reflector has a reflection surface which is an elliptical surface whose center axis is not aligned with an optical axis of the first low beam module; one or more high beam modules configured to generate a high beam distribution; and wherein the first low beam module includes a lens having a height of about 10 mm.

According to a fourth aspect, the invention may be further characterized by one or any combination of the features described herein, such as the high luminance source is a high luminance light emitting diode; the first luminous distribution includes a maximum intensity hotspot region; each module includes a heat sink; and a focal length of each module is in a range from about 3 mm to about 6 mm.

It should be appreciated that the above referenced aspects and examples are non-limiting, as others exist within the present invention, as shown and described herein.

DESCRIPTION OF DRAWINGS

A more complete appreciation of the invention and many of the attendant advantages thereof will be readily obtained as the same becomes better understood by reference to the detailed description herein when considered in connection with the accompanying drawings, wherein.

DETAILED DESCRIPTION OF PREFERRED EMBODIMENTS

Figure 1:
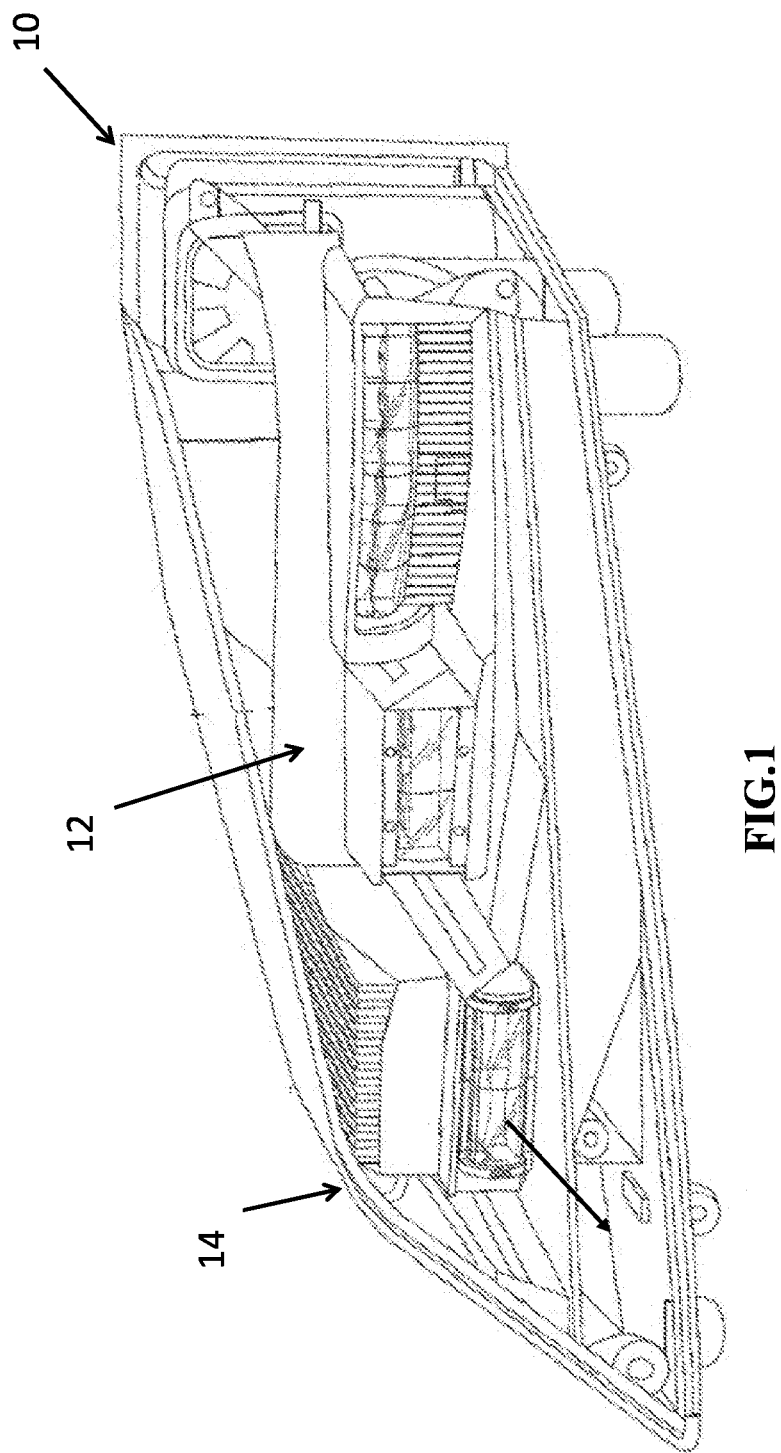
FIG. 1 is a schematic of a headlamp assembly according to the present invention.

The present invention relates to a compact or miniaturized design enhancement within a thin-aspect low-beam kink module that forms a hot spot that still enables meeting regulation requirements. Furthermore, the present invention relates to providing a low-beam kink module that reduces packaging profiles, enhances power or lighting efficiencies and achieves target outputs by using a single laser light source.

Referring now to the drawings, wherein like reference numerals designate identical or corresponding parts throughout several views, the following description relates to an optical system for a headlamp. The headlamp provides a beam pattern that conforms to various standards amongst multiple forums: Society of Automotive Engineers (SAE), Economic Commission for Europe (ECE) standards, China Compulsory Certification (CCC) standard, and/or any other country having lighting regulations as would be understood by one of ordinary skill in the art.

FIG. 1 presents a schematic of a headlamp assembly 10 according to one example. Headlamp assembly 10 includes an optical system 12 and an enclosure 14. An exploded view of the headlamp assembly is shown in FIG. 2. Optical system 12 includes one or more light modules to provide high- and low-beam illumination patterns. Typically, low-beam illumination is used whenever another vehicle is on the road directly ahead of motor vehicle and/or whenever another vehicle is approaching motor vehicle from an opposite direction.

Figure 2C:
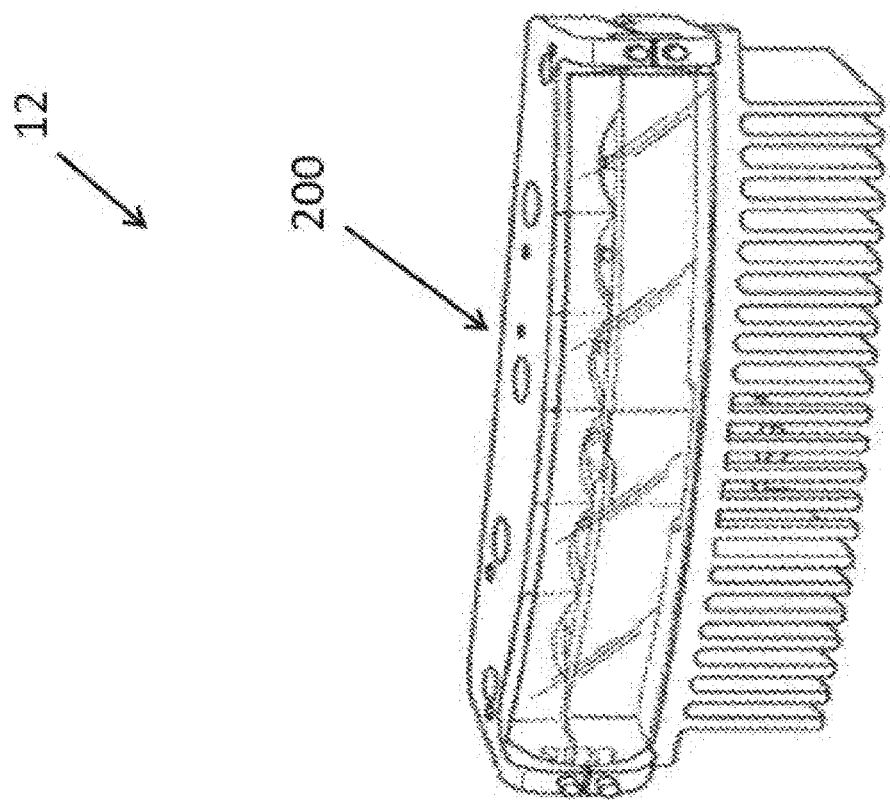
FIGS. 2A, 2B and 2C represent perspective views of distinguished aspects of the present invention.
Figure 2A:
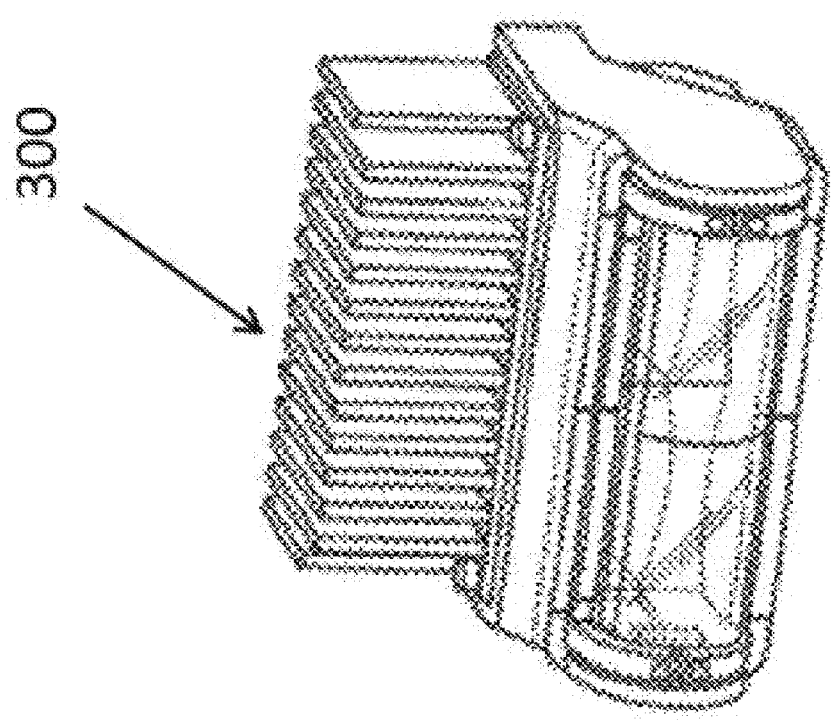
Figure 2B:
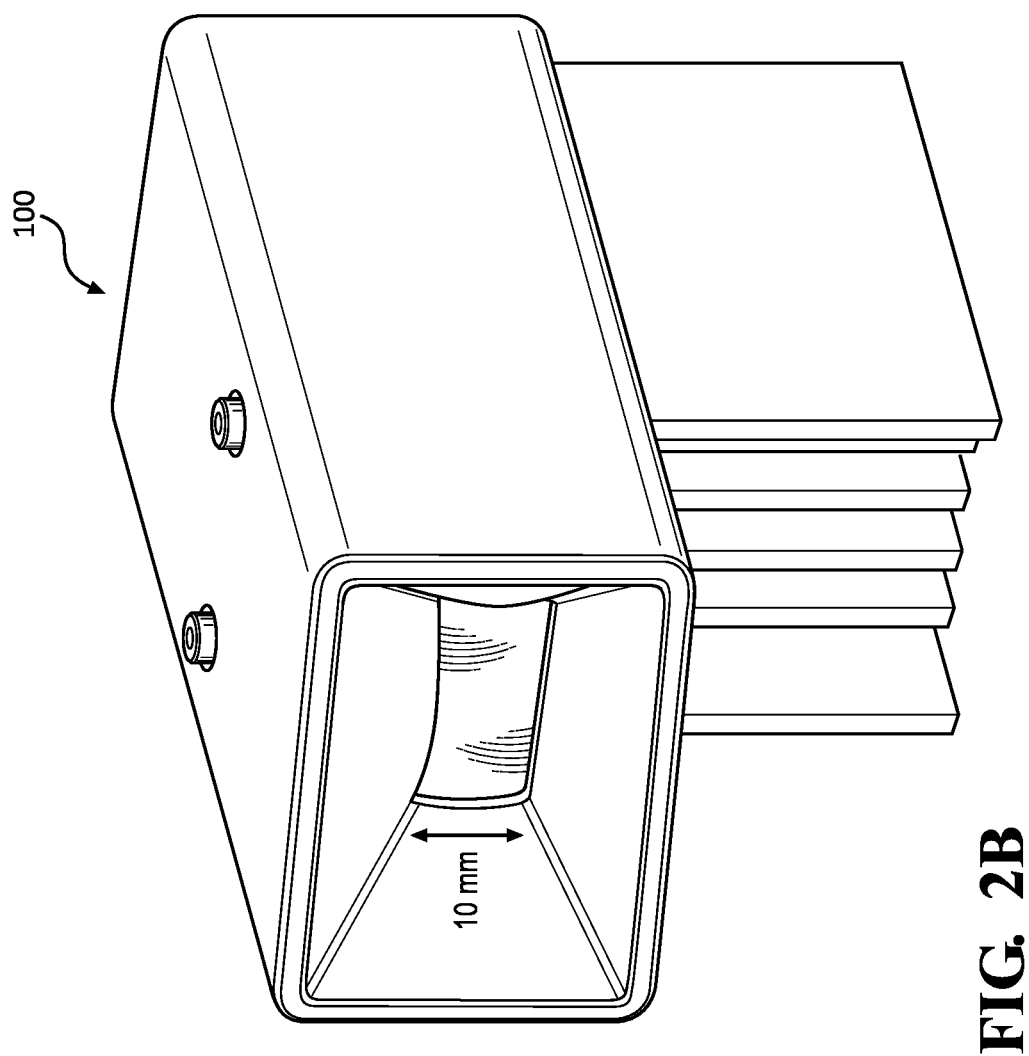

Optical system 12 may include a first low beam module 100, a second low beam module 200, and a high beam module 300, as shown in the FIGS. 2A-2C. In one implementation, the first low beam module 100, the second low beam module 200, and the high beam module 300 are projector type lighting modules. For example, the first low beam module 100 is a kink low beam module. The second low beam module 200 is a flat low beam module. In an embodiment, the first low beam module 100 has a lens height of 10 mm, and the second low beam module 200, and the high beam module 300 have a lens height of 15 mm.

It is contemplated that relationship between the components and component assemblies are surprisingly important in solving one or more issues described in the background section above. Each of the components and component assemblies and the associated relationships are disclosed in greater detail and specifically in the following paragraphs.

Low Beam Module:

Low beam module generates a low luminescent beam in magnitude of about 25,000-50,000 Candelas that would achieve a flux range of between 450-1000 Lumens. The low luminescent beam may also be called passing beam or dipped beam. Low luminescent beams provide a light distribution sufficiently forward and lateral illumination without dazzling oncoming vehicles.

The kink low beam module generates a cut off profile in a beam pattern. As is known to one skilled in the art, the cut-off is a defined line of cut-off below which light from the headlamp assembly is projected. In general, the light output is below the cut-off which is below the eyes of a driver in an oncoming vehicle. The kink or elbow is used to facilitate illuminating a side of the road where road signs and pedestrians are and lower oncoming traffic.

High Beam Module:

High beam module generates a high luminescent beam in magnitude of about 55,000-100,000 Candelas that would achieve a flux range of between 650 to 1500 Lumens. High beam may also be referenced as main beam or full beam. High beams provide a central weighted distribution of light with no control of glare.

The first low beam module 100 is one or more low beam modules that provide a beam pattern having a cut-off profile known by the term "kink" or "elbow. The second low beam module 200 may be one or more low beam modules that provide a spread beam pattern.

The modules described herein may be adapted based on available packaging and to meet customers' new requirements (styling, optical performances). Each of the modules described herein may be a stand-alone module. In other implementations, two modules may be implemented as a single module. For example, the first low beam module and the second low beam module may be implemented as a single low-beam module.

Figure 3B:
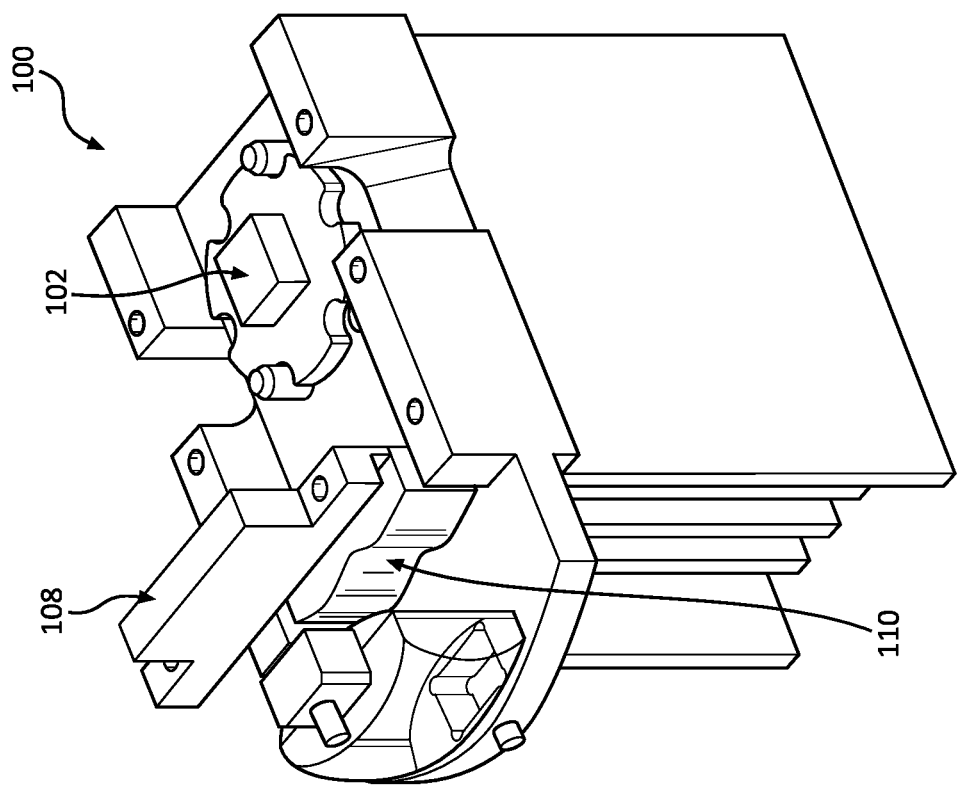
FIG. 3B is a perspective view of a first low-beam module without a reflector according to the present invention.
Figure 3A:
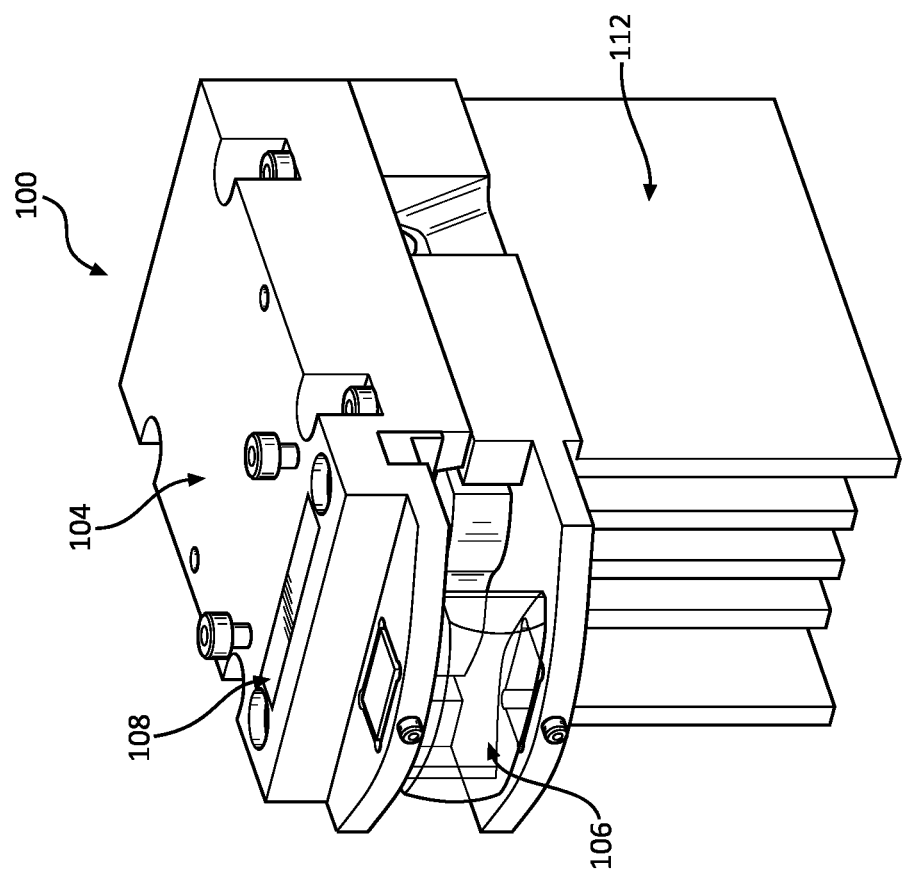
FIG. 3A is a perspective view of a first low-beam module according to the present invention.
Figure 3C:
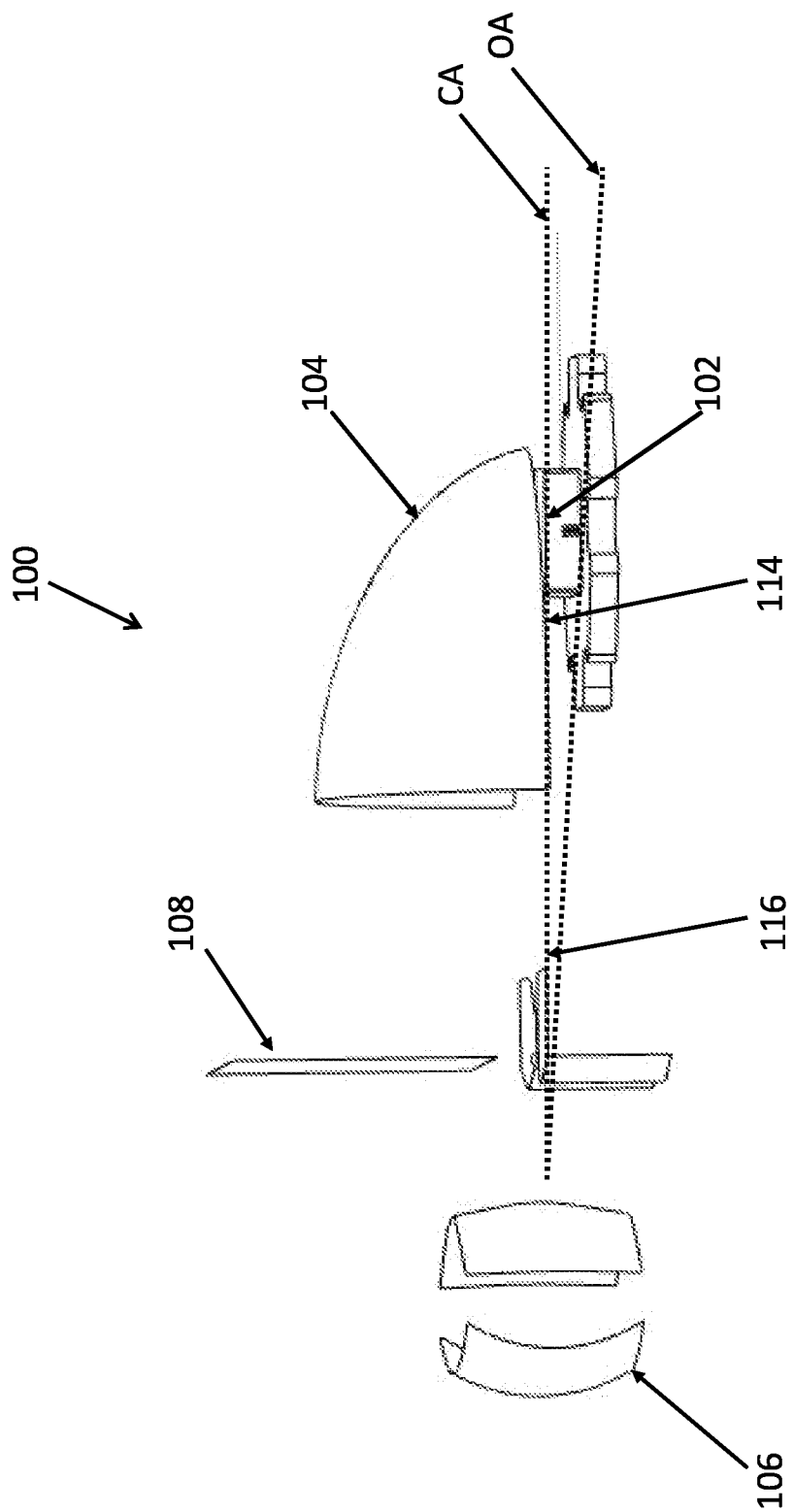
FIG. 3C is a schematic that shows a reflector, a lens and a folder of the first low-beam module according to the present invention.

FIG. 3A is a perspective view of the first low beam module 100 according to one example. The first low beam module 100 may include a top view of the first low beam module 100 as is shown in FIG. 3B. FIG. 3C is a schematic that shows the reflector 104 according to one example.

The first low beam module 100 comprises: a high luminous source 102 (generally luminance source >200 Cd per $mm^2$), in example, a laser light source that emits light along an optical axis; a reflector 104 that reflects the light emitted from a luminous source forward; and a projection lens 106 having a height of about 10 mm that is arranged in operative relationship with reflector 104. The first low beam module 100 further comprises a folder 108 arranged in an optical path between the reflector 104 and the projection lens 106, and the folder 108 includes a bump 110 to generate the first luminous intensity distribution with the kink or elbow.

It is contemplated that the relationship between components and their associated assemblies are surprisingly important in solving one or more issues described in the background section above. Each of the components and component assemblies and the associated relationships are disclosed in greater detail and specifically in the following paragraphs.

Light Source

Light source represents a visually perceived source of electromagnetic radiation or an energized source of visually perceived radiant energy (inclusive of "Visible" light within the electromagnetic spectrum) but may include a broad combination or range of electromagnetic or radiant energy inclusive from among X-rays, ultraviolet and infrared energy, micro-wave and radio-wave spectrums. The light source may include every conventional and suitable lighting element sources such as filament-based or incandescent lamps, fluorescent lamps, arc or gas-discharge type lights, light emitting diodes (LED), or other suitable conventional sources.

High Luminous Light Source

The high luminous source is a laser light source having a luminance of about 300 $Cd/mm^2$ and a flux of about 500 Lm plus or minus a 10% variation.

Aspect Ratio

Aspect ratio is preferably expressed as a height-to-width ratio of a component but may alternatively be expressed as a ratio of a width to a height of a component also. In an embodiment, the first low beam module has an aspect ratio of height-to-width of about 2.5 to 1 (or alternatively by width-to-height 10:25) of a component.

Kink or Elbow

A beam pattern having a cut-off profile known by the term "kink" or "elbow. The first low beam module is 100 adapted to generate a first luminous intensity distribution with a kink or elbow. The first low beam module 100 or kink provides a "hot spot" for the low beam maximum intensity regulation target. As is known to one skilled in the art, the cut-off is a defined line of cut-off below which light from the headlamp assembly is projected. In general, the light output is below the cut-off which is below the eyes of a driver in an oncoming vehicle. The kink or elbow is used to facilitate illuminating a side of the road where road signs and pedestrians are and lower oncoming traffic.

Reflector

The major functional aim of the reflector is to capture the greatest possible share of the luminous flux radiated by the light source and to direct this towards the road. There are various different reflector systems available to enable headlamp designers to meet this requirement as effectively as possible.

In an aspect, reflector 104 has a reflection surface which conforms with an elliptical surface whose center axis CA is not aligned with the optical axis OA. This can be seen from the FIG. 3C. Reflector 104 may include a single cavity including a high luminance LED, for example, a laser light source, as shown in FIG. 3C. In contrast, a kink module using standard LEDs may include two (2) or more LEDs to achieve the same performance. As can be seen from FIG. 3C, reflector 104 includes a first focal point 114 and a second focal point 116. In one aspect, a focal length of the first focal point is about 4 mm and the focal length of the second focal point is about 30 mm. The high luminance LED 102 is arranged at first focal point 114 of the ellipse formed by reflector 104, and second focal point 116 is at a distance of about 18 mm to 20 mm from lens 106. Furthermore, as can be seen from FIG. 3C, the optical axis OA of the first low beam module 100 is offset from center axis CA of the elliptical surface.

Lens

Lenses with optics function by deflecting, scattering or focusing the luminous flux collected by the reflector in such a way that the required light distribution, such as the cut-off line, is produced. Lens 102 is made of heat resistant polymethyl methacrylate (PMMA), polycarbonate (PC), silicone, glass, or such similar thermoplastic or polymeric material, for examples. However, other materials and dimensions of segments are contemplated by the embodiments described herein.

Folder and Bump

A cut-off in the beam can be produced using a metal plate that may be termed "a folder." Folder 108 has a material with a reflectivity in the range of about 0.8 to about 0.97.

Bump 110 on folder 108 is used to create a notch in the beam pattern at a test point (i.e. 0.86D-3.5L). By contrast without the bump on folder 108, there would be a need to re-aim the beam and therefore lose light downstream on the road and deviate from targets by increasing IIHS demerits. Bump 110 may have a spherical shape. In another implementation, bump 110 may have a triangular shape. Bump 110's shape and dimensions may be tailored or optimized based on these IIHS requirements.

In some embodiments, the notch can be located substantially to the left of vertical axis V. In other embodiments, the notch can be positioned symmetrically around the vertical axis V. Placement of the notch is generally dependent on the particular safety requirements and user preferences that do not conflict with the safety requirements.

Figure 4B:
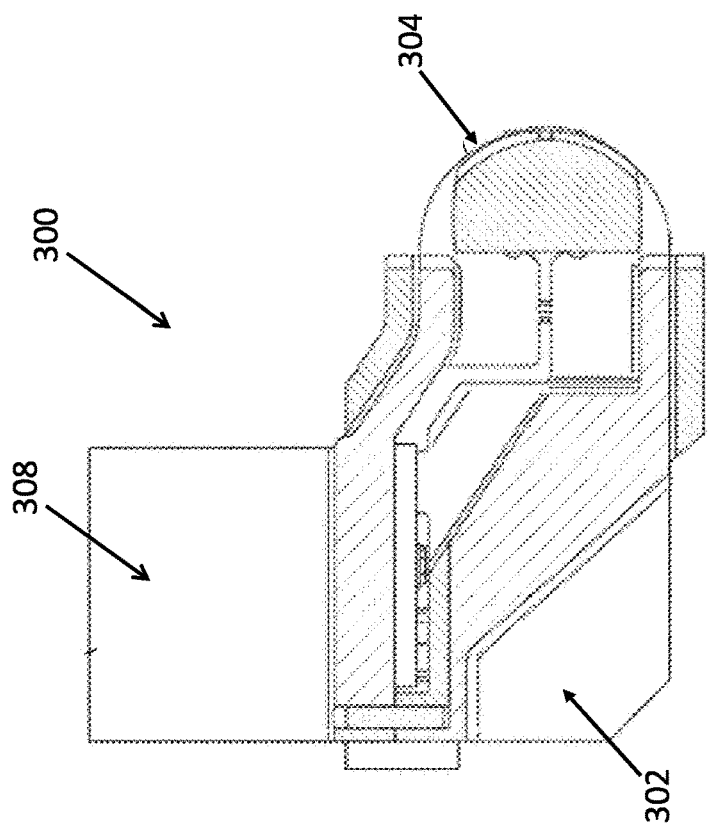
FIG. 4B is a cross-section view of the high-beam module according to the present invention.
Figure 4A:
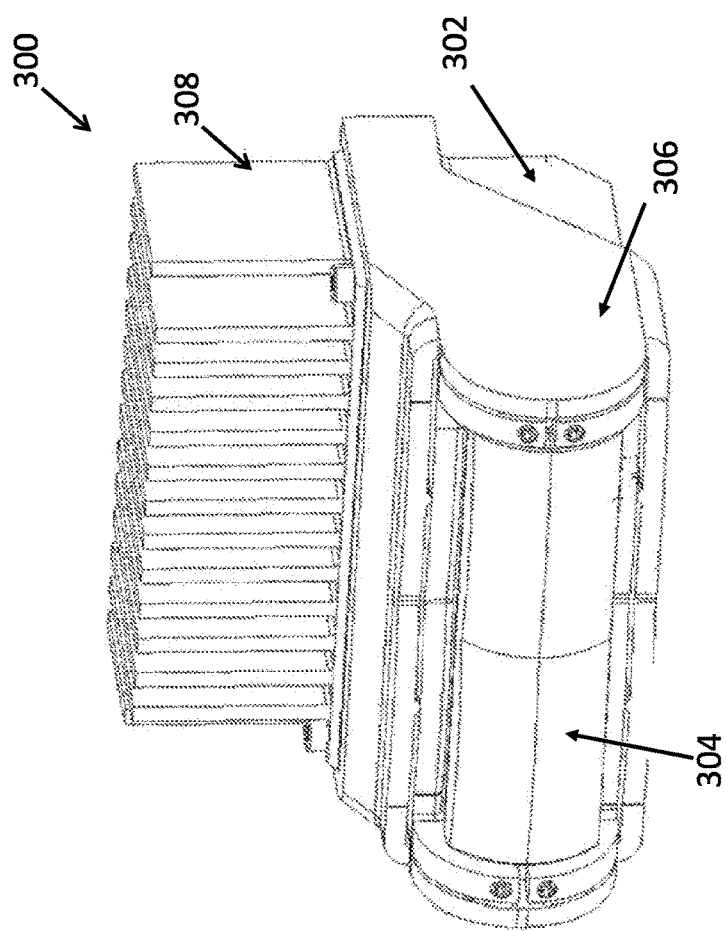
FIG. 4A is a perspective view of a high-beam module according to the present invention.
Figure 4C:
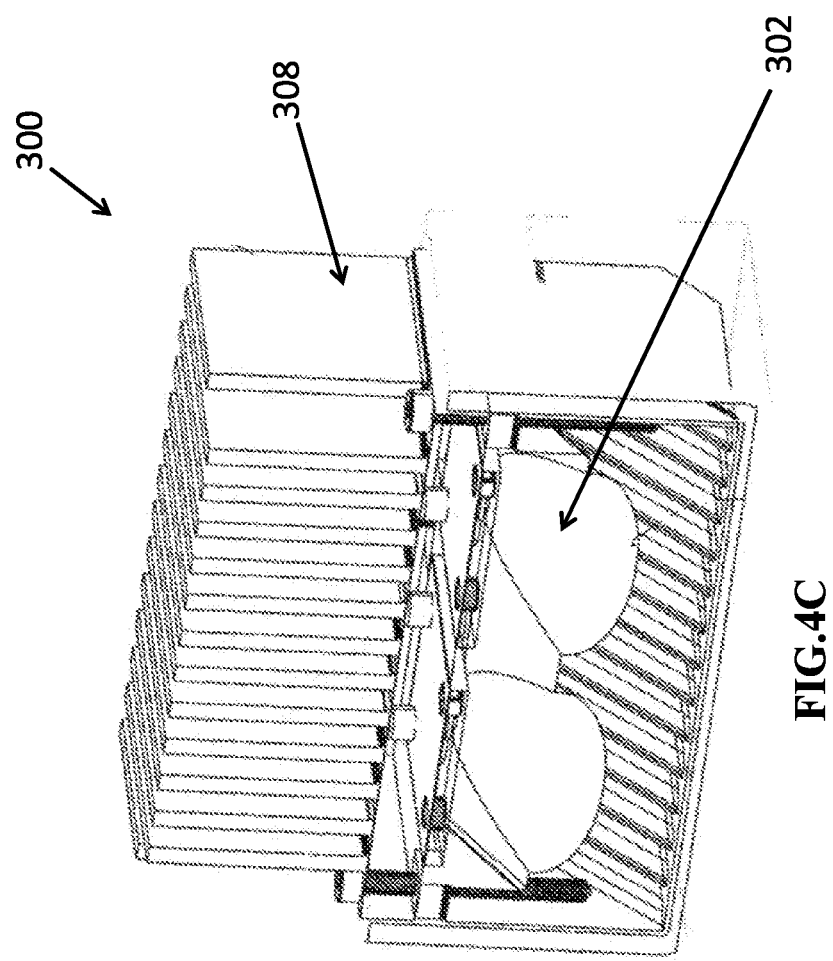
FIG. 4C is a cross-section view of the high-beam module according to the present invention.

FIG. 4A is a perspective view of the high beam module 300 according to one example. The high beam module 300 may include one or more high luminance LEDs (not shown). The high beam module 300 can be one or more modules configured to generate a high beam illumination. For example, a high beam module may include a single high luminance LED or may include multiple high luminance LEDs. The optical system 12 may include one or more high beam modules, each of the high beam modules including one or more high luminance LEDs. The high beam module 300 provides high beam illumination for maximum intensity regulation and following customer requirements. The high beam module 300 includes a reflector 302, a lens 304, a housing or enclosure 306, and a heat sink 308. FIG. 4B and FIG. 4C are cross section views of the high beam module 300.

Lens 304 may be made of polymethyl methacrylate (PMMA), polycarbonate (PC), silicone, glass, or similar thermoplastic or polymeric materials, for example. However, other materials and dimensions of segments are contemplated by embodiments described herein. By alternative examples, a single continuous lens 304 and reflector 302 are shown in FIGS. 4A and 4B. However, separate reflector segments are also contemplated by embodiments described herein.

Figure 5B:
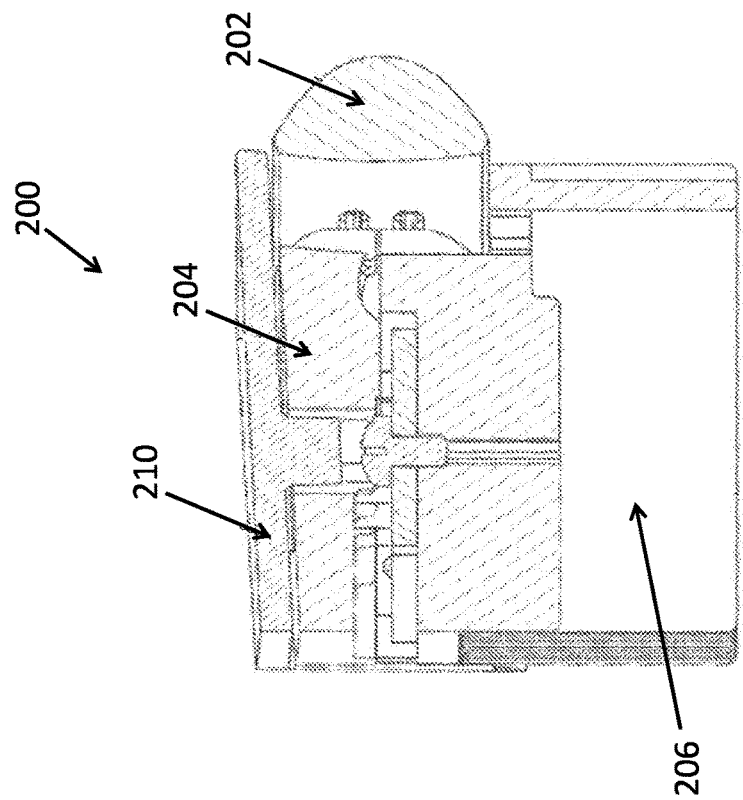
FIG. 5B is a cross-section view of the second low-beam module according to the present invention.
Figure 5A:
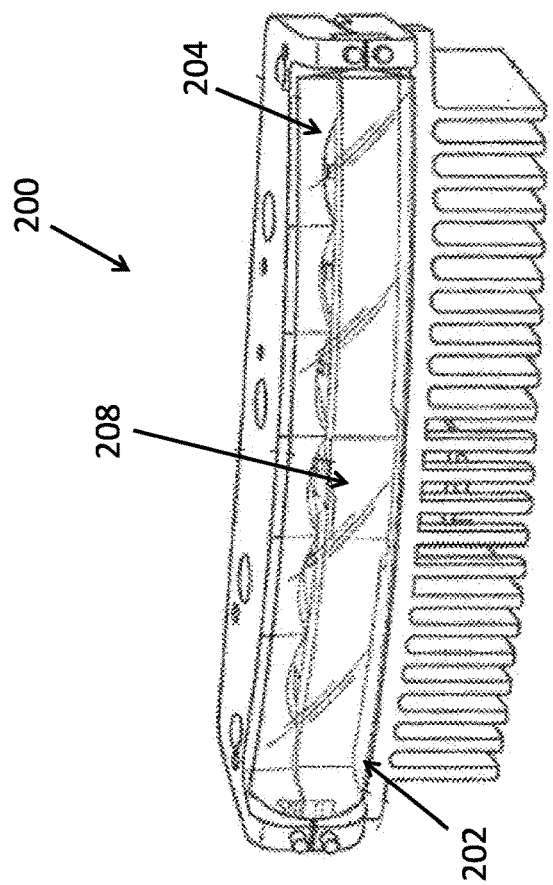
FIG. 5A is a perspective view of a second low-beam module according to the present invention.

FIG. 5A is a schematic that shows a second low beam module 200 or a flat low beam module according to one example. Second low beam module 200 may include one or more standard light sources. Second low beam module 200 or flat low beam module 200 functions to direct flux on the road and achieve light beam spread distribution. The flat low beam module 200 generates a flat intensity profile that is generally lacking in a central region of high intensity when compared to other embodiments described herein. Examples of light sources include, but are not limited to semiconductor light-emitting diodes (LEDs), organic light-emitting diodes (OLEDs), polymer light-emitting diodes (PLEDs), and monolithic light-emitting diodes (MLEDs). In one implementation, the light sources may be high luminance LEDs. In one implementation, the light sources may have a luminance lower than the high luminance LEDs of the first low beam module 100. The optical system of the second low beam module 200 is adapted for a 20 mm height lens or less. In one implementation, the second low beam module 200 may be one or more modules each including a light source. In one implementation, the second low beam module 200 may include six LEDs.

Figure 5C:
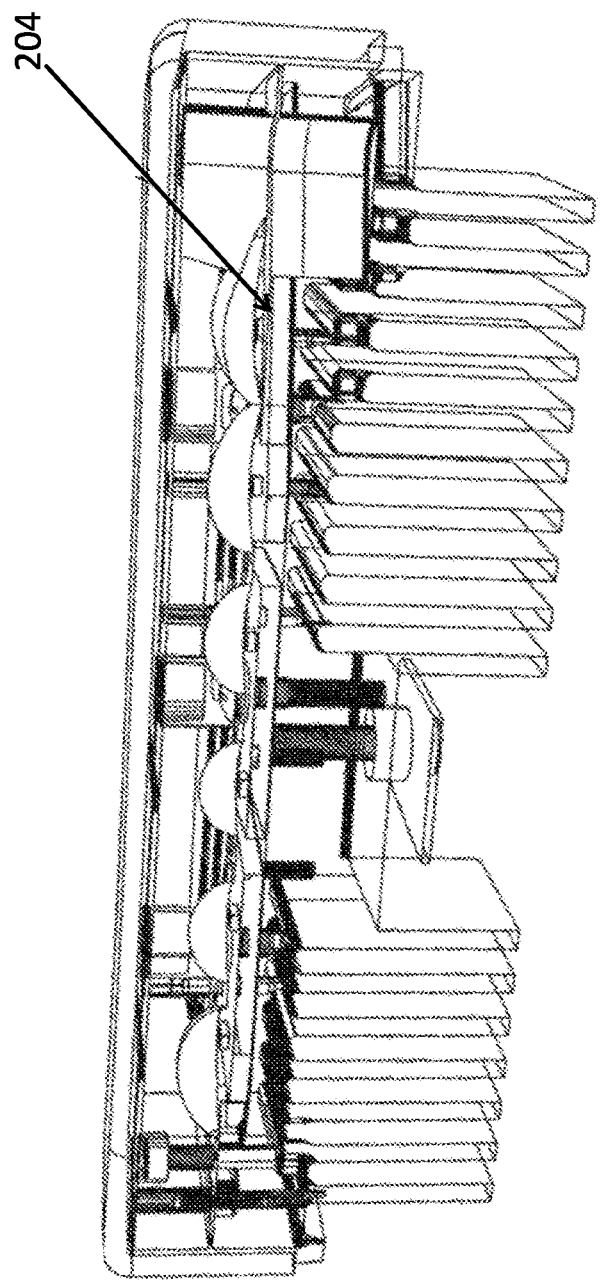
FIG. 5C is a cross-section view of the second low-beam module according to the present invention.

Second low beam module 200 includes a lens 202, a reflector 204, a housing 210, a heat sink 206, and a file 208. A single continuous lens 202 and folder 208 are shown in FIG. 5A and FIG. 5B. However, separate reflector segments and lenses are also contemplated by embodiments described herein. For example, each of the LEDs may be included in a separate module. FIG. 5B and FIG. 5C show cross-sectional view of the second low beam module.

Optical systems for each of the modules has a short focal length compared to optical systems conventionally used in headlamps. The focal length is a function of the desired optical height of the lenses. The focal lengths of the optical system for each module may be less than 6 mm. In one implementation, the focal length may be less than 5 mm. The focal length of the optical system for each of the first low beam module 100, the second low beam module 200, and the high beam module 300 may be in the range from about 3 mm to about 6 mm range, or from about 2.5 mm to about 4.5 mm range, or in incremental units of about 3 mm, 3.2 mm, 3.4 mm, 3.6 mm, 3.8 mm, 4 mm, 4.2 mm, 4.4 mm, 4.6 mm, 4.8 mm or 5 mm.

Figure 6:
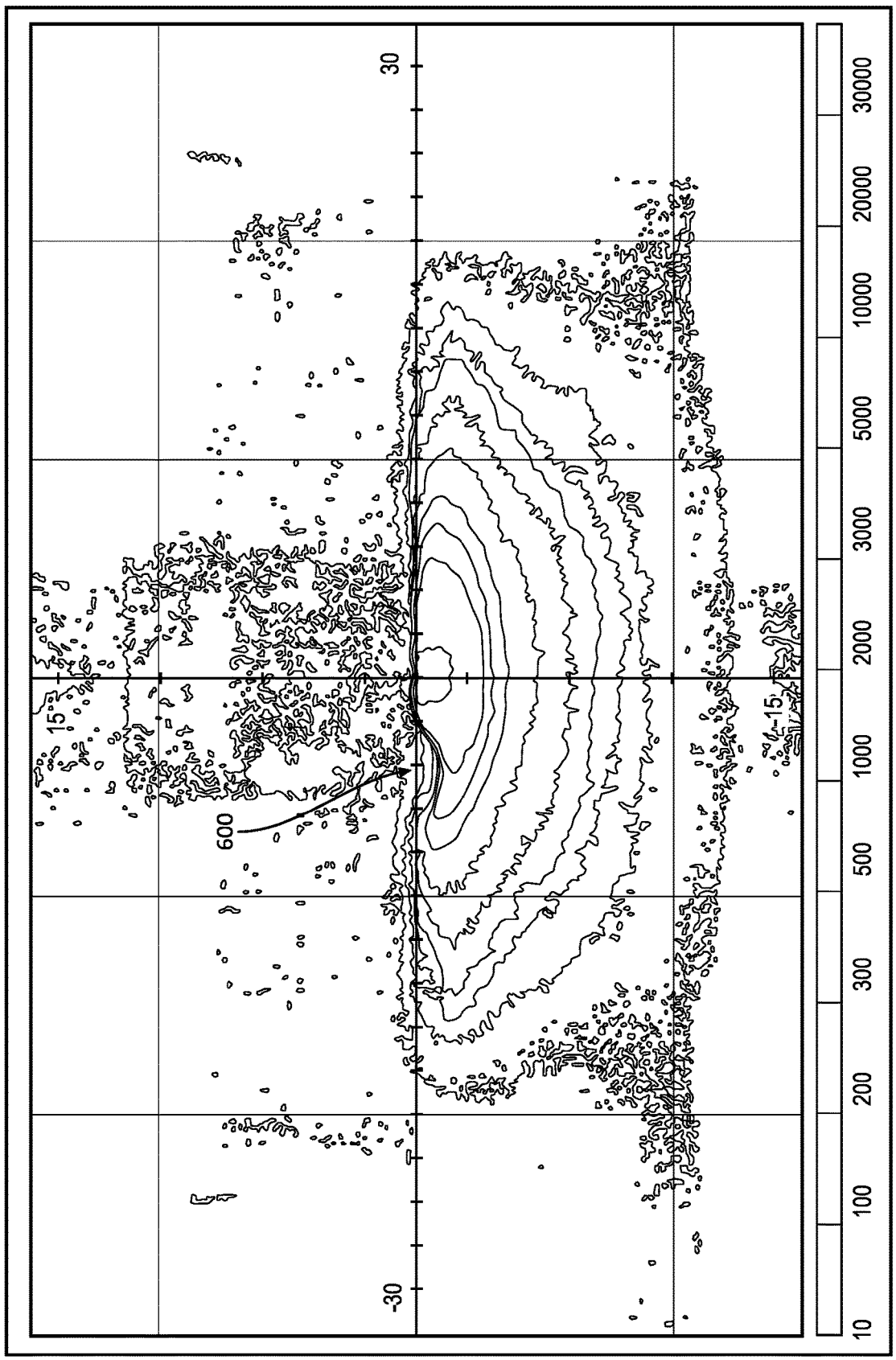
FIG. 6 is a schematic that shows an exemplary luminous intensity distribution of the first low-beam module according to the present invention.

Photometric simulations of low beam modules applying Insurance Institute of Highway Safety (IIHS) measurement ratings for optimized scores (i.e. flat module 100 equipped with critical test points and kink module 200 equipped with a folder bump) were performed. 600 in FIG. 6 indicates the test point 0.86D-3.5L corresponding to an approaching vehicle driver.

FIG. 6 is a schematic that shows an exemplary luminous intensity distribution of the first low beam module 100 according to one example. Horizontal axis H and vertical axis V identify horizontal and vertical planes intersecting both the center of the headlamp and the screen. Horizontal axis H and vertical axis V shown in FIG. 6 include tick marks spaced at 2° intervals. The maximum intensity is located at a position of −0.5 degrees along the horizontal axis and −0.1 degrees along the vertical axis. The maximum intensity illustrated is 31400 cd having a total lumen flux of 125 Lm, by an example.

The modules described herein may be controlled via one or more control circuits (not shown in the Figures).

The present invention is not limited in its implementation to the above described embodiments. Rather, a number of variants which make use of the described solution even for basically different configurations. More particularly, the present invention is not limited to the embodiments of the lighting unit as a frontal head of the motor vehicle. The present invention is also directed to lighting units that serve as a tail light of the motor vehicle.

Although the present disclosure is provided with references to figures, all of the embodiments shown in figures are intended to explain the preferred embodiments of the present invention by ways of examples, instead of being intended to limit the present invention.

It should be apparent and would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least two (2) units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

LIST OF ELEMENT NUMBERS

Headlamp assembly 10
Optical System 12
Enclosure 14
First low beam module 100
Second low beam module or flat low beam module 200
High beam module 300

High luminous source 102
Reflector 104
Projection lens 106
Folder 108
Bump 110
Heat sink 112
First focal point 114
Second focal point 116
Lens 202
Reflector 204
Heat sink 206
Folder 208
Housing 210
Reflector 302
Lens 304
Housing 306
Heat sink 308
Test Point 600
Center axis CA
Optical axis OA

The invention claimed is:

1. An optical arrangement system of a vehicle headlamp, the optical arrangement system comprises:
a first low-beam module adapted to generate a first luminous intensity distribution with a kink or elbow, wherein the low-beam module includes:
a high luminous source configured to emit light along an optical axis;
a reflector for reflecting the light emitted from the high luminous source forward;
a projection lens having a height of about 10 mm that is arranged in operative relationship with the reflector; and
a folder arranged in an optical path between the reflector and the projection lens, where the folder includes a bump configured to generate the first luminous intensity distribution with the kink or elbow;
wherein the reflector has a reflection surface represented by an elliptical surface whose center axis is not aligned with the optical axis; and
wherein the optical arrangement system further comprises a second low-beam module including at least one light source optically configured to emit a second luminous distribution having a larger beam spread distribution as compared to the first luminous intensity distribution.

2. The optical arrangement system of claim 1, wherein the first low-beam module has an aspect ratio of width to height of about 10:25.

3. The optical arrangement system of claim 1, wherein the reflector includes a first focal point and a second focal point.

4. The optical arrangement system of claim 1, wherein a focal length of the first focal point is about 4 mm and the focal length of the second focal point is about 30 mm.

5. The optical arrangement system of claim 3, wherein the high luminous source is arranged at the first focal point of the ellipse formed by the reflector.

6. The optical arrangement system of claim 1, wherein the optical axis is radially offset from the center axis of the elliptical surface.

7. The optical arrangement system of claim 3, wherein the second focal point is at a distance of about 18 mm to 20 mm from the lens.

8. The optical arrangement system of claim 1, wherein the first luminous intensity distribution includes a maximum intensity of a hot spot region.

9. The optical system arrangement system of claim 1, wherein the high luminous source includes a laser light source.

10. The optical arrangement system of claim 1, wherein the bump has a spherical shape.

11. The optical arrangement system of claim 1, wherein the bump has a triangular shape.

12. The optical arrangement system of claim 1, wherein a high-beam module is configured to generate a high-beam distribution.

13. An optical arrangement system for a headlamp, comprising:
a first low-beam module adapted to generate a first luminous intensity distribution with a kink or elbow, wherein the low-beam module includes:
a high luminous source configured to emit light along an optical axis;
a reflector for reflecting the light emitted from the high luminous source forward;
a projection lens having a height of about 10 mm that is arranged in operative relationship with the reflector; and
a folder arranged in an optical path between the reflector and the projection lens, and the folder includes a bump configured to generate the first luminous intensity distribution with the kink or elbow;
wherein the reflector has a reflection surface that is an elliptical surface whose center axis is not aligned with the optical axis;
wherein the reflector includes a first focal point and a second focal point, and wherein a focal length of the first focal point is about 4 mm and the focal length of the second focal point is about 30 mm; and further comprises
a second low-beam module including at least one light source optically configured to emit a second luminous distribution having a larger beam spread distribution as compared to the first luminous intensity distribution.

14. A headlamp assembly, comprising:
a plurality of low-beam modules having a first low-beam module optically configured to emit a first luminous distribution with a kink;
a second low-beam module optically configured to emit a second luminous distribution without a kink feature that has a larger beam spread distribution as compared to the first luminous distribution, wherein each first low-beam module includes
a reflector for reflecting the light emitted from at least one high luminous source forward, where the reflector has a reflection surface that is an elliptical surface whose center axis is not aligned with an optical axis of the first low-beam module and
where each first low-beam module includes a lens having a height of about 10 mm; and
a number of high-beam modules are configured to generate a high-beam distribution.

15. The headlamp assembly of claim 14, wherein the high luminance source is a laser light source.

16. The headlamp assembly of claim 14, wherein the first luminous distribution includes a maximum intensity hotspot region.

17. The headlamp assembly of claim 14, wherein each low-beam module includes a heat sink.

18. The headlamp assembly of claim 14, wherein a focal length of each low-beam module is in a range from about 3 mm to about 6 mm.

* * * * *